(12) United States Patent
Yang et al.

(10) Patent No.: US 12,391,282 B2
(45) Date of Patent: Aug. 19, 2025

(54) SYSTEMS AND METHODS FOR VIRTUALLY TOWING AN AUTONOMOUS ELECTRIC-POWERED TRAILER

(71) Applicant: Pebble Mobility, Inc., Sunnyvale, CA (US)

(72) Inventors: Bingrui Yang, Los Altos, CA (US); Stefan Solyom, Los Altos, CA (US)

(73) Assignee: Pebble Mobility Inc., Fremont, CA (US)

( * ) Notice: Subject to any disclaimer, the term of this patent is extended or adjusted under 35 U.S.C. 154(b) by 0 days.

(21) Appl. No.: 18/438,204

(22) Filed: Feb. 9, 2024

(65) Prior Publication Data

US 2024/0270283 A1 Aug. 15, 2024

Related U.S. Application Data

(60) Provisional application No. 63/444,864, filed on Feb. 10, 2023.

(51) Int. Cl.
*B60W 60/00* (2020.01)
*B60W 30/165* (2020.01)
*B62D 13/00* (2006.01)
*G08G 1/16* (2006.01)

(52) U.S. Cl.
CPC ...... *B60W 60/0025* (2020.02); *B60W 30/165* (2013.01); *B62D 13/00* (2013.01); *G08G 1/16* (2013.01)

(58) Field of Classification Search
None
See application file for complete search history.

(56) References Cited

U.S. PATENT DOCUMENTS

| | | | |
|---|---|---|---|
| 11,212,654 B2 * | 12/2021 | Bai | B60W 30/143 |
| 11,702,096 B1 * | 7/2023 | Wells | H04W 4/90 |
| | | | 340/435 |
| 2009/0164109 A1 * | 6/2009 | Maruyama | B60W 30/16 |
| | | | 701/116 |
| 2017/0001639 A1 * | 1/2017 | Dempsey | G08G 1/16 |
| 2017/0072967 A1 * | 3/2017 | Fendt | B60W 60/0053 |
| 2017/0122757 A1 * | 5/2017 | Rajab | G01C 21/3438 |
| 2018/0237012 A1 * | 8/2018 | Jammoussi | B60W 50/082 |
| 2019/0375406 A1 * | 12/2019 | Yamashita | G06V 20/63 |
| 2020/0057453 A1 * | 2/2020 | Laws | B60W 30/18 |
| 2020/0257311 A1 * | 8/2020 | Kim | G05D 1/0289 |
| 2020/0286387 A1 * | 9/2020 | Zhou | G08G 1/0175 |
| 2021/0109535 A1 * | 4/2021 | Tansey | G05D 1/0011 |
| 2021/0110484 A1 * | 4/2021 | Shalev-Shwartz | G05D 1/0088 |
| 2021/0150429 A1 * | 5/2021 | Atanasiu | G01C 21/3469 |
| 2021/0245759 A1 * | 8/2021 | Yonemura | G08G 1/22 |

(Continued)

*Primary Examiner* — David P. Merlino
(74) *Attorney, Agent, or Firm* — Womble Bond Dickinson (US) LLP (57) ABSTRACT

A system and method for orchestrating movement between an autonomous electric-powered (AEP) trailer and a towing entity includes detecting a presence of a towing entity, generating a movement synchronization pairing proposal between an autonomous electric-powered (AEP) trailer and the towing entity based on detecting the presence of the towing entity; and orchestrating a virtual tow-link between the AEP trailer and the towing entity based on obtaining user input accepting the movement synchronization pairing proposal.

19 Claims, 4 Drawing Sheets

Conventional Towing

Virtual Towing (56) References Cited

U.S. PATENT DOCUMENTS

| | | | |
|---|---|---|---|
| 2022/0041069 A1* | 2/2022 | Layfield | B60L 7/10 |
| 2022/0063622 A1* | 3/2022 | Jumpertz | B60W 10/00 |
| 2022/0105934 A1* | 4/2022 | Shieh | B60W 40/1005 |
| 2022/0308577 A1* | 9/2022 | Pasch | G05D 1/0027 |
| 2023/0019462 A1* | 1/2023 | Busse | B60W 60/0011 |
| 2023/0073287 A1* | 3/2023 | Iba | B60W 30/188 |
| 2023/0121868 A1* | 4/2023 | Kuttenreich | B62D 15/025 |
| | | | 701/23 |
| 2023/0132179 A1* | 4/2023 | Salehi | G05D 1/0293 |
| | | | 701/24 |
| 2024/0025451 A1* | 1/2024 | Grace | B60D 1/62 |
| 2024/0140425 A1* | 5/2024 | Ferone | B60W 30/165 |

* cited by examiner

Conventional Towing

Virtual Towing

FIGURE 3

Conventional Towing

Virtual Towing

FIGURE 4

SYSTEMS AND METHODS FOR VIRTUALLY TOWING AN AUTONOMOUS ELECTRIC-POWERED TRAILER

CROSS-REFERENCE TO RELATED APPLICATIONS

This application claims the benefit of U.S. Provisional Application No. 63/444,864, filed 10 Feb. 2023, which is incorporated herein in its entirety by this reference.

TECHNICAL FIELD

This invention relates generally to the autonomous electric trailer field, and more specifically, to a new and useful system and method for virtually towing an autonomous electric-powered (AEP) trailer.

BACKGROUND

Modern vehicle trailer design and technology appear to be misaligned with the evolution, current technologies, and designs of towing vehicles. In particular, standard vehicle trailers are designed to be passive entities that only move or stop when forces generated by a tow vehicle acts on these trailers. However, as a significant sum of modern vehicles are transitioning to alternative powering mechanisms (e.g., electric power) for driving and operating these modern vehicles, driving range often becomes a concern when a passive trailer is in tow. Similarly, lesser towing-capable vehicles (e.g., sedans or the like) that may use typical combustion engines may have difficulty towing standard trailers carrying challenging loads.

Thus, there is a need in the autonomous electric trailer field to create new and useful methods and systems for an autonomous and assistive movement of an electric-powered trailer.

The embodiments of the present application described herein provide technical solutions that address, at least, the need described above.

BRIEF SUMMARY OF THE INVENTION(S)

In some embodiments, a method for orchestrating movement between an autonomous electric-powered (AEP) trailer and a towing entity includes detecting a presence of a towing entity; generating a movement synchronization pairing proposal between an autonomous electric-powered (AEP) trailer and the towing entity based on detecting the presence of the towing entity; and orchestrating a virtual tow-link between the AEP trailer and the towing entity based on obtaining user input accepting the movement synchronization pairing proposal, wherein orchestrating the virtual tow-link includes: (1) sourcing real-time sensing data indicative of current driving dynamics of the towing entity, (2) estimating a trajectory of the towing entity based on the real-time sensing data, (3) generating a set of movement synchronization actuator commands based on the trajectory of the towing entity, (4) executing, at the AEP trailer, the set of movement synchronization actuator commands to emulate the trajectory of the towing entity, and (5) repeating (1)-(4) until the virtual tow-link is deactivated.

In some embodiments, generating the movement synchronization pairing proposal includes capturing, via at least one optical sensor of the AEP trailer, one or more images of the towing entity, adding the one or more images of the towing entity to the movement synchronization pairing proposal, and transmitting the movement synchronization pairing proposal to an electronic device in operative communication with the AEP trailer for user confirmation.

In some embodiments, the set of movement synchronization actuator commands includes one or more actuator commands that cause the AEP trailer to follow the towing entity at a pre-determined trailing distance, and executing the set of movement synchronization actuator commands causes the AEP trailer to maintain the pre-determined trailing distance while emulating the trajectory of the towing entity.

In some embodiments, the AEP trailer is configured to operate in a plurality of modes, including (i) a physical tethering mode and (ii) a virtual tethering mode that orchestrates the virtual tow-link, the virtual tow-link causes the AEP trailer to follow the towing entity at a pre-determined trailing distance, and the pre-determined trailing distance at which the AEP trailer follows the towing entity during the virtual tethering mode is substantially similar to a distance between the AEP trailer and the towing entity during the physical tethering mode.

In some embodiments, the AEP trailer is configured to operate in a plurality of modes, including (i) a physical tethering mode and (ii) a virtual tethering mode, when the AEP trailer is operating in the physical tethering mode, the AEP trailer is mechanically coupled to the towing entity and dynamically provides torque assistance to the towing entity via one or more motors of the AEP trailer, and when the AEP trailer is operating in the virtual tethering mode, the AEP trailer is virtually coupled to the towing entity via the virtual tow-link and adaptively maintains a pre-determined trailing distance from the towing entity.

In some embodiments, the virtual tow-link causes the AEP trailer to follow the towing entity at a pre-determined trailing distance. In some embodiments, the method further comprises computing a maximum aerodynamic drag-reducing trailing distance for the AEP trailer based on a shape of the AEP trailer and a shape of the towing entity, and using the maximum aerodynamic drag-reducing trailing distance as the pre-determined trailing distance if the optimal aerodynamic drag-reducing trailing distance satisfies a minimum separation distance and a maximum separation distance.

In some embodiments, sourcing real-time sensing data at least includes sensing a lateral position of the towing entity, estimating the trajectory of the towing entity includes estimating that the towing entity is performing a lateral movement maneuver when the lateral position of the towing entity changes by more than a threshold amount during a specified time interval, and when the trajectory of the towing entity relates to the lateral movement maneuver: generating the set of movement synchronization actuator commands at least includes generating one or more actuator commands that cause a lateral movement of the AEP trailer to match a lateral movement of the towing entity within the specified time interval, and executing the set of movement synchronization actuator commands causes the AEP trailer to emulate the lateral movement maneuver being performed by the towing entity.

In some embodiments, sourcing real-time sensing data at least includes sensing a current directional orientation of the towing entity, estimating the trajectory of the towing entity includes estimating that the towing entity is undergoing a directional change maneuver when the current directional orientation of the towing entity changes by more than a threshold amount during a specified time interval, and when the trajectory of the towing entity relates to the directional change maneuver: generating the set of movement synchronization actuator commands at least includes generating one or more actuator commands that cause a path of the AEP trailer to move into alignment with the trajectory of the towing entity, and executing the set of movement synchronization actuator commands causes the AEP trailer to emulate the directional change maneuver being performed by the towing entity.

In some embodiments, sourcing real-time sensing data at least includes sensing a current speed of the towing entity, estimating the trajectory of the towing entity includes estimating that a speed of the towing entity changed when the current speed of the towing entity deviates from a previously observed speed, and when the trajectory of the towing entity indicates that the speed of the towing entity has changed: generating the set of movement synchronization actuator commands at least includes generating one or more actuator commands that change a speed of the AEP trailer for maintaining a pre-determined trailing distance between the towing entity and the AEP trailer, and executing the set of movement synchronization actuator commands causes the AEP trailer to emulate changes to the speed of the towing entity.

In some embodiments, the method further comprises implementing an electronic fail-safe for the virtual tow-link that, when disrupted, causes the AEP trailer to initiate a pre-defined safety protocol, wherein: the pre-defined safety protocol executes autonomous driving operations that cause the AEP trailer to move to a stopping location, and the AEP trailer remains parked at the stopping location until the electronic fail-safe is re-established.

In some embodiments, the real-time sensing data is further indicative of a current trajectory of the towing entity, and estimating the trajectory of the towing entity includes using a predictive model that is configured to predict future trajectory changes of the towing entity based at least on the current trajectory of the towing entity.

In some embodiments, sourcing the real-time sensing data includes one or more of: sensing a current position of the towing entity, sensing a current speed of the towing entity, sensing a current rate of acceleration of the towing entity, sensing a current rate of deceleration of the towing entity, and sensing a current steering angle of the towing entity.

In some embodiments, the method further comprises detecting, by the AEP trailer, that a current trajectory of the AEP trailer is likely to result in a collision with an object, and based on detecting that the current trajectory of the AEP trailer is likely to result in the collection with the object: forgoing executing the set of movement synchronization actuator commands that emulate the trajectory of the towing entity, and executing, by the AEP trailer, collision-avoidance maneuvers that deviate from the trajectory of the towing entity to prevent the collision with the object.

In some embodiments, a computer-implemented method comprises detecting a presence of a towing entity; generating a movement synchronization pairing proposal between an autonomous electric-powered (AEP) trailer and the towing entity based on detecting the presence of the towing entity; and orchestrating a virtual tow-link between the AEP trailer and the towing entity based on obtaining user input accepting the movement synchronization pairing proposal, wherein orchestrating the virtual tow-link includes: (1) sourcing real-time sensing data indicative of current driving dynamics of the towing entity, (2) estimating a trajectory of the towing entity based on the real-time sensing data, (3) generating a set of movement synchronization actuator commands based on the trajectory of the towing entity, (4) executing, at the AEP trailer, the set of movement synchronization actuator commands to emulate the trajectory of the towing entity, and (5) repeating (1)-(4) until the virtual tow-link is deactivated.

In some embodiments, when the trajectory of the towing entity indicates that a speed of the towing entity has changed: generating the set of movement synchronization actuator commands at least includes generating one or more actuator commands that change a speed of the AEP trailer for maintaining a pre-determined trailing distance between the towing entity and the AEP trailer.

In some embodiments, when the trajectory of the towing entity relates to a lane change maneuver: generating the set of movement synchronization actuator commands at least includes generating one or more actuator commands that cause a lateral displacement of the AEP trailer to increase relative to a center of the towing entity, In some embodiments, when the trajectory of the towing entity relates to a turning maneuver: generating the set of movement synchronization actuator commands at least includes generating one or more actuator commands that cause the AEP trailer to increase a trailing distance relative to the towing entity.

In some embodiments, the virtual tow-link causes the AEP trailer to follow the towing entity at a pre-determined trailing distance, and the pre-determined trailing distance at which the AEP trailer follows the towing is substantially similar to a distance between the AEP trailer and the towing entity during a physical coupling of the towing entity and the AEP trailer.

In some embodiments, when the AEP trailer is operating in a physical tethering mode, the AEP trailer is mechanically coupled to the towing entity and dynamically provides torque assistance to the towing entity via one or more motors of the AEP trailer, and when the AEP trailer is operating in a virtual tethering mode, the AEP trailer is virtually coupled to the towing entity via the virtual tow-link and adaptively maintains a pre-determined trailing distance from the towing entity.

In some embodiments, the computer-implemented method further comprises implementing a fail-safe for the virtual tow-link that, when disrupted, causes the AEP trailer to execute autonomous driving operations that cause the AEP trailer to move to a stopping location, and remain parked at the stopping location until the fail-safe is re-established.

In some embodiments, generating the movement synchronization pairing proposal includes capturing, via an optical sensor of the AEP trailer, an image of the towing entity, adding the image of the towing entity to the movement synchronization pairing proposal, and transmitting the movement synchronization pairing proposal to an electronic device in operative communication with the AEP trailer for user confirmation.

DESCRIPTION OF THE PREFERRED EMBODIMENTS

The following description of the preferred embodiments of the invention(s) is not intended to limit the invention(s) to these preferred embodiments, but rather to enable any person skilled in the art to make and use the invention(s).

1. Autonomous Electric-Powered Trailer System

Figure 1:
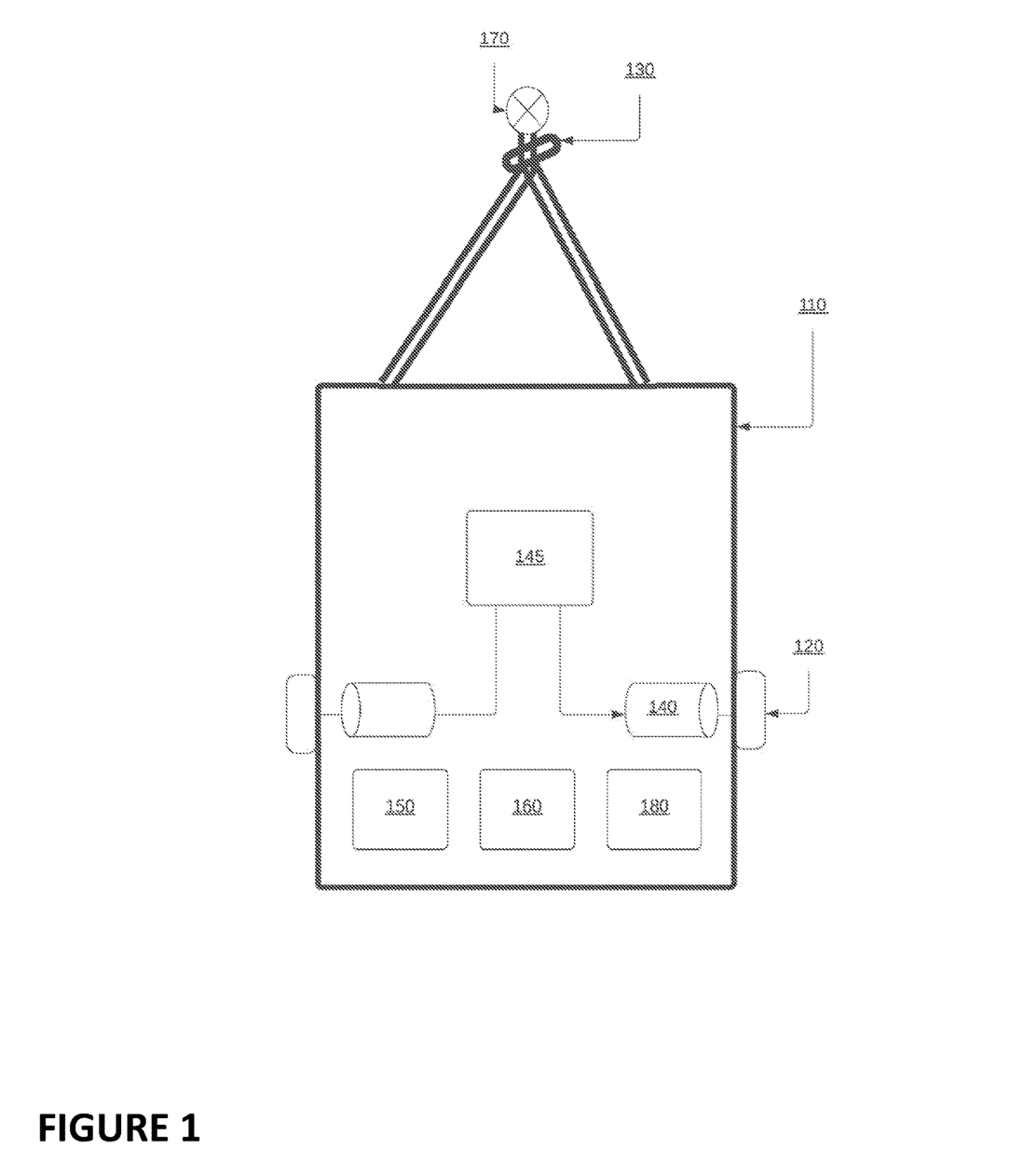
FIG. 1 illustrates a schematic representation of a system 100 in accordance with one or more embodiments of the present application.

As shown by reference to FIG. 1, an autonomous electric-powered trailer system 100 for assistive driving transport with a tow entity (e.g., a tow vehicle) and, in some circumstances, while detached from a tow entity, autonomous transport or movement may include a chassis 110 of an AEP trailer system 100, a plurality of wheels 120 (motorized/unmotorized), a steerable axle/caster wheel 130, one or more electric motors 140 powered by a battery subsystem 145, sensor suite 150, an autonomous trailer control subsystem 160, a coupler (e.g., tow vehicle hitch receiver) 170, and a trailer-tow vehicle communication interface or subsystem 180.

The autonomous electric-powered trailer system 100 may preferably be implemented in conjunction with a tow vehicle or the like having an independent propulsion system. In a tethered driving operation, an autonomous driving behavior of the AEP trailer system 100 may be responsive to and/or informed by an initial driving behavior of the tow vehicle. In such cases, the one or more sensing devices 150 of the AEP trailer system 100 may operate to identify driving activity and/or operations of a tow vehicle tethered to the AEP trailer system 100 and responsively compute autonomous movement and/or driving control instructions for the AEP trailer system 100.

1.10 Trailer Chassis

The chassis 110 of the AEP trailer system 100 preferably comprises a load-bearing framework of an artificial object that preferably structurally supports the artificial object in its construction and function. That is, in some embodiments, the chassis 110 may be an undercarriage used to transport a load or container over the road. In one or more embodiments, the chassis 110 may include a frame having a composition of one or more materials, which may include a combination of metals (e.g., steel) and/or wood-based components. The chassis 110 preferably additionally includes one or more axles that support the attachment of the plurality of wheels 120 and the caster wheel 130, a trailer tongue or the like that extends from a main body of the chassis, a coupler arranged at a distal end of the trailer tongue, a cranking or jacking mechanism arranged along the trailer tongue.

1.20 Wheels

The plurality of wheels 120 of the AEP trailer system 100 are preferably attached to the one or more axles of the chassis 110. In some embodiments, the plurality of wheels 120 may be powered by and/or include the one or more motors 140 and may include a braking system.

In a first implementation, each of the plurality of wheels 120 or a subset of the plurality of wheels 120 may include or may be powered by at least one of the one or more motors 140. In this first implementation, the at least one motor of a given wheel may be independently powered and operated to enable an independent movement of the given wheel. While the at least one motor may enable an independent operation of the given wheel, it shall be recognized that each motor of each wheel may be operated in coordination or in concert to enable various driving operations of the AEP trailer system 100.

In a second implementation, each pair (i.e., left wheel/right wheel defining a pair) of the plurality of wheels 120 may be powered by a single motor of the one or more motors 140. In such embodiments, the single motor may be arranged along an axle onto which each distinct wheel of the pair of wheels may be arranged at each respective end of the axle. In this second implementation, the pair of wheels may be operated in a coordination based on an operation of the single motor.

It shall be recognized that, in some embodiments, the AEP trailer system 100 may include a plurality of axles in which only a subset of the plurality of axles includes the one or more motors 140.

1.30 Steerable Axle|Caster Wheel

The steerable axle 130 preferably functions to support or enable directional movements of the AEP trailer system 100. In one or more embodiments, the steerable axle 130 includes a caster wheel. In one implementation, the steerable axle 130 may be powered by an independent motor of the one or more motors 140 arranged along the steerable axle 130 to rotate the caster wheel. In another implementation, the steerable axle 130 may be passive and a movement of the caster wheel may be encouraged by a movement of one or more of the plurality of wheels 120 when powered by the one or more motors 140.

Additionally, or alternatively, the steerable axle 130 may include a cranking or jacking mechanism (not shown) that operates to lift and lower the steerable axle 130. In one or more embodiments, the cranking or jacking mechanism may be electric-powered and an operation thereof automated and/or controlled by the AEP trailer system 100. In a non-limiting example, the cranking or jacking mechanism may be operated during one or more automated tethering or automated hitching operations in which the AEP trailer system 100 operates to automatically hitch its coupler to a tow hitch or tethering mechanism of a tow entity. In some embodiments, the jacking mechanism may enable or semi-manual (e.g., external electronic jacking interface of the AEP trailer) or manual intervention (e.g., a manual crank) for lifting and/or lowering a coupler of the AEP trailer system 100 to a tethering mechanism.

1.40 Electric Motors

The one or more electric motors 140 of the AEP trailer system 100 preferably function to produce torque for turning one or more of the plurality of wheels 120, the steerable axle 130, and/or the jacking mechanism of the AEP trailer system 100. In one or more embodiments, the one or more electric motors 140 may be powered by energy outputs of the battery subsystem 145 to generate the torque outputs for operating one or more mechanisms (e.g., wheels, jack, etc.) of the AEP trailer system 100.

As mentioned above, the one or more motors 140, in varying embodiments, may be arranged along the chassis 110 and/or the plurality of wheels 120 in any suitable manner for achieving a steering and driving of the AEP trailer system 100. In one implementation, the one or more motors 140 may be arranged along an axle shared between pairs of wheels. In another implementation, the one or more motors 140 may be arranged on distinct, independent axles that uniquely power each respective wheel of the plurality of wheels 120. In a further implementation, a combination of the aforementioned implementations may be combined to optimize driving and/or steering operations of the AEP trailer system 100.

1.45 Battery Subsystem

The battery subsystem 145 is preferably in electrical communication with each of the electric-powered components of the AEP trailer system 100 and may function to provide energy outputs to the electric-powered components based on control signals from the autonomous trailer control subsystem 160.

Additionally, or alternatively, the battery subsystem 145 may include a battery stack that may include a plurality of distinct batteries or energy storage devices. In one or more embodiments, the battery stack may include a plurality of distinct batteries in which subsets of one or more batteries may be dedicated to a distinct electric-powered component of the AEP trailer system 100. In this way, power consumption of various electronic components of the AEP trailer system 100 and/or the over consumption of the electric-powered components may be intelligently managed to increase safety and/or efficiency of the AEP trailer system 100.

1.50 Sensing Devices

The sensor suite 150 preferably functions to observe and/or collect data from one or more components of the AEP trailer system 100, an environment and/or circumstances surrounding the AEP trailer system 100 and/or a tow entity, a coupler component and/or coupled subsystem, and/or the like. Accordingly, in one or more embodiments, the sensor suite 150 may function to periodically and/or continuously measure a behavior of static and dynamic objects in an environment of the AEP trailer system 100, a behavior of a tow entity (in either a tethered or untethered state) and measure self-behavior.

In a preferred embodiment, the sensor suite 150 or onboard sensors (e.g., computer vision system, LIDAR, RADAR, ultrasonic sensors, pressure sensors, wheel speed sensors, encoders, IMU, GPS, cameras, etc.) are in operable communication with the autonomous trailer control subsystem 160. Additionally, or alternatively, the sensor suite 150 may comprise one or more strain gauge load sensors for measuring towing load forces acting on the AEP trailer. These one or more strain gauge load sensors, in some embodiments, may be mounted on a tongue of the AEP trailer, mounted on an A-frame coupled to the AEP trailer tongue, and/or mounted at a plurality of other locations on the AEP trailer chassis 110.

The sensor suite 150 preferably includes sensors used to perform autonomous trailer operations (such as automated tethering, towing propulsion assist, autonomous driving, and/or the like) and data capture regarding the circumstances surrounding the AEP trailer system 100 as well as data capture relating to operations of the AEP trailer system 100 but may additionally or alternatively include sensors dedicated to detecting maintenance needs of the AEP trailer system 100. For example, the sensor suite 150 may include motor feedback and/or diagnostic sensors or an exterior pressure sensor strip. As another example, the sensor suite 150 may include sensors dedicated to identifying a position of a tethering nexus (e.g., a tow hitch or the like) relative to a position of the AEP trailer system 100.

1.60 Autonomous Trailer Control Subsystem

The AEP trailer system 100 preferably includes an autonomous trailer control subsystem 160 (e.g., an onboard computer operably integrated with the AEP trailer) but can additionally or alternatively be decoupled (e.g., not onboard) from the AEP trailer system 100 (e.g., a user mobile device operating independent of the autonomous trailer). That is, in one or more embodiments, parts of the autonomous trailer control subsystem 160 may be operated and/or performed remotely by one or more external computing systems (e.g., a mobile user device, remote cloud computing system) that be may in operable control communication with the AEP trailer system 100 (e.g., via a network, short-range communication system, and the like).

Additionally, or alternatively, the autonomous trailer control subsystem 160 may include a processing system (e.g., graphical processing unit (GPU), central processing unit (CPU), or any suitable processing circuitry) as well as memory and a sensor fusion system. The memory can be short term (e.g., volatile, non-volatile, random-access memory or RAM, etc.) and/or long term (e.g., flash memory, hard disk, etc.) memory.

In one or more embodiments, the sensor data fusion system may function to synthesize and process sensor data for deriving artifacts (e.g., load measurements, tow vehicle acceleration/braking, and the like), predicting the presence, location, classification, and/or path of objects and features of the environment of the AEP trailer system 100. In various embodiments, the sensor data fusion system may function to incorporate data from multiple sensors and/or data sources, including but not limited to cameras, LIDARS, radars, remote data feeds (Internet-based data feeds, weather feeds, and the like), and/or any number of other types of sensors.

As discussed below, the AEP trailer system 100 may additionally include a trailer communication interface 180 that includes a wireless communication system (e.g., Wi-Fi, Bluetooth, cellular 3G, cellular 4G, cellular 5G, multiple-input multiple-output or MIMO, one or more radios, or any other suitable wireless communication system or protocol), a wired communication system (e.g., modulated powerline data transfer, Ethernet, or any other suitable wired data communication system or protocol), sensors, and/or a data transfer bus (e.g., CAN, FlexRay). In a preferred embodiment, the autonomous trailer control subsystem 160 may operate to interact with and/or operably control any or one or more of the identified components or modules described herein.

Additionally, or alternatively, the AEP trailer system 100 may be in operable communication with a remote or disparate computing system that may include a user device (e.g., a mobile phone, a laptop, etc.), a remote server, a cloud server, or any other suitable local and/or distributed computing system remote from the AEP trailer system 100. The remote computing system may preferably be connected to one or more systems of the autonomous trailer through one or more data connections (e.g., channels), but can alternatively communicate with the AEP trailer system in any suitable manner.

The autonomous trailer control subsystem 160 preferably functions to control the AEP trailer system 100 and process sensed data from a sensor suite (e.g., a computer vision system, LIDAR, flash LIDAR, wheel speed sensors, GPS, etc.) of the AEP trailer system 100 and/or other sensors to determine states of the AEP trailer system 100 and/or states of agents in an operating environment of the AEP trailer system 100. Based upon the states of the autonomous trailer and/or agents in the operating environment and programmed instructions, the autonomous trailer control subsystem 160 preferably modifies or controls behavior of AEP trailer system 100.

The autonomous trailer control subsystem 160 is preferably a general-purpose computer adapted for I/O communication with AEP trailer control systems and sensor systems but may additionally or alternatively be any suitable computing device.

Additionally, or alternatively, the autonomous trailer control subsystem 160 is preferably connected to the Internet via a wireless connection (e.g., via a cellular link or connection). Additionally, or alternatively, the autonomous trailer control subsystem 160 may be coupled to any number of wireless or wired communication systems.

The positioning system processes sensor data along with other data to determine a position (e.g., a local position relative to a map, an exact position relative to lane of a road, AEP trailer heading, velocity, position relative to a tow vehicle, etc.) of the AEP trailer system 100 relative to the environment. Additionally, or alternatively, in an un-tethered state (e.g., the AEP trailer is disconnected from a tow hitch), the guidance system processes sensor data along with other data to determine a path for the AEP trailer system 100 to follow, e.g., in circumstances in which the AEP trailer system 100 may autonomously or semi-autonomously travel to a tow hitch or towing nexus of a tow vehicle. Additionally, or alternatively, in some examples, the AEP trailer system 100 may obtain or collect path planning data from an associated tow vehicle.

In various embodiments, the controller may function to implement machine learning techniques to assist the functionality of the controller, such as feature detection/classification, obstruction mitigation, route traversal, mapping, sensor integration, ground-truth determination, and the like.

Additionally, or alternatively, in some embodiments, the autonomous trailer control subsystem may include a vision perception system or module that include extensible machine learning-based objection classification sub-modules trained for predicting and/or classifying varying areas (e.g., a rear) of a tow entity, a position of tethering nexus, and/or the like.

Additionally, or alternatively, the vision perception system or module may implement one or more ensembles of trained machine learning models. The one or more ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a machine learning classifier, computer vision model, convolutional neural network (e.g., ResNet), visual transformer model (e.g., ViT), object detection model (e.g., R-CNN, YOLO, etc.), regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a semantic image segmentation model, an image instance segmentation model, a panoptic segmentation model, a keypoint detection model, a person segmentation model, an image captioning model, a 3D reconstruction model, a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation from transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the AEP trailer system 100. Further, any suitable model (e.g., machine learning, non-machine learning, etc.) may be implemented in the various systems and/or methods described herein.

1.80 Trailer-Tow Vehicle Communication Interface

The trailer-tow vehicle communication interface 180 preferably enables the AEP trailer system 100 to communicate and/or exchange data with systems, networks, and/or devices external to and/or that may be independent of the AEP trailer system 100. Preferably, the trailer-tow vehicle communication interface 180 enables one or more entity devices and/or user devices/applications to communicate directly with the AEP trailer system 100. The trailer-tow vehicle communication interface 180 preferably includes one or more of a cellular system (or any suitable long-range communication system), direct short-wave radio, vehicle-to-vehicle (V2V) communication, vehicle-to-everything (V2X) communication, or any other suitable short-range communication system.

2. Method for Virtually Towing an AEP Trailer

Figure 2:
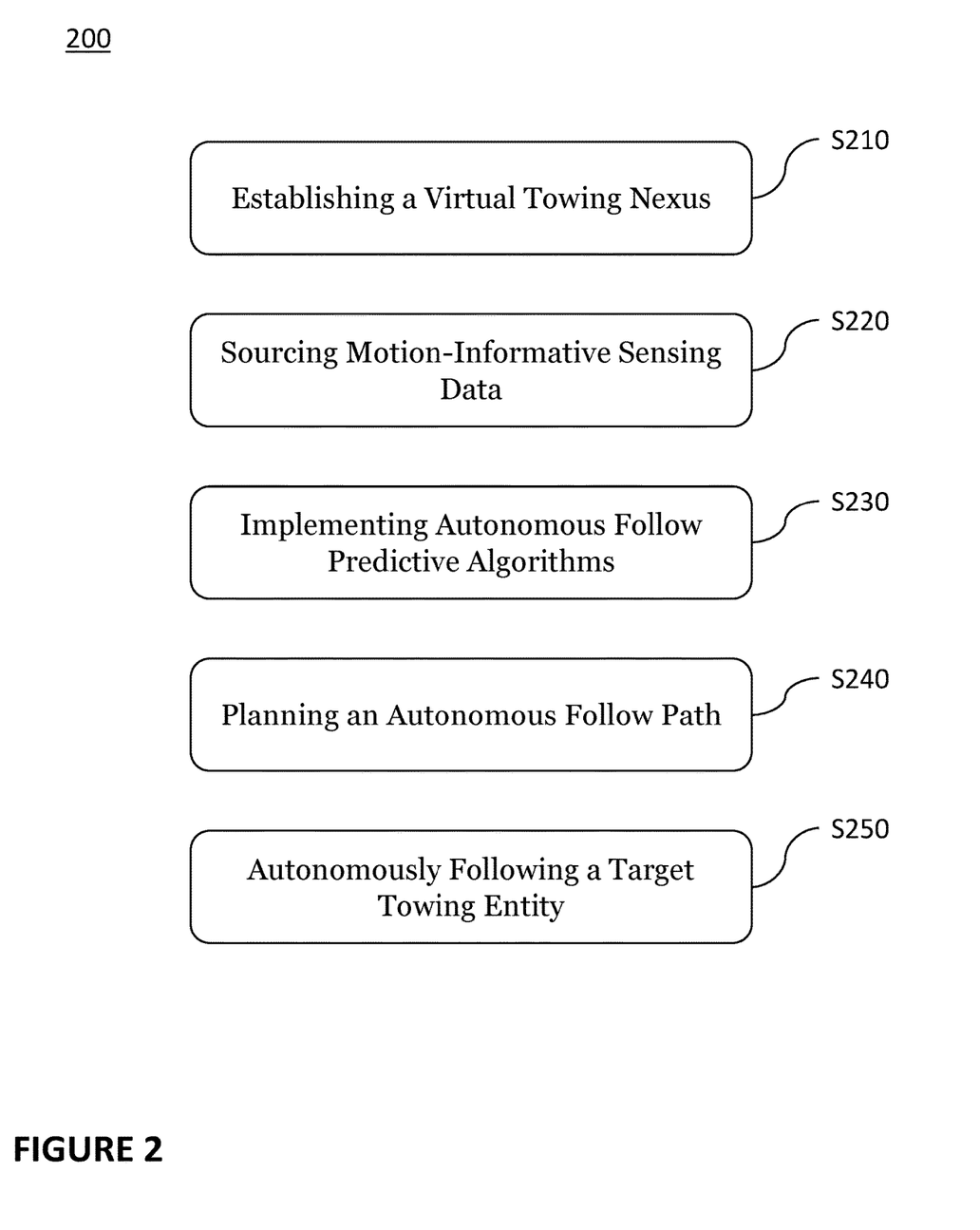
FIG. 2 illustrates an example method 200 in accordance with one or more embodiments of the present application.

As shown in FIG. 2, a method 200 for virtually towing an autonomous electric-powered (AEP) trailer includes establishing a virtual towing nexus (S210), sourcing motion-informative sensing data (S220), implementing one or more autonomous follow predictive algorithms (S230), planning an autonomous follow path (S240), and autonomously following the towing entity based on executing the autonomous follow path (S250).

2.10 Establishing a Virtual Towing Nexus

S210, which includes establishing a virtual towing nexus, may function to establish a virtual towing nexus (e.g., virtual tow-link) between an autonomous electric-powered (AEP) trailer and a towing entity. In some embodiments, the virtual towing nexus (e.g., virtual tow-link), as generally referred to herein, may relate to a digital or virtual communication channel that, once established, enables a towing entity (e.g., tow vehicle, lead vehicle, and/or the like) to virtually tow one or more AEP trailers. For instance, in a non-limiting example, upon establishing a virtual towing nexus, the virtual towing nexus may enable (or aid) a towing entity in towing one or more AEP trailers without an explicit mechanical coupling (or mechanical linkage) existing between such entities.

It shall be noted that, in some embodiments, such a virtual towing nexus may enable several towing-related technical benefits including, but not limited to, reducing or removing the requirement for a tow vehicle to comprise a towing nexus (e.g., trailer hitch), reducing or removing the requirement for a tow vehicle to have suitable towing power, and reducing or removing the mental burden on a driver when towing one or more trailers/recreational vehicles (RVs).

Identifying a Candidate Lead Vehicle

In some embodiments, establishing the virtual towing nexus may include identifying a candidate lead vehicle (e.g., a tow vehicle). The candidate lead vehicle, in some embodiments, may relate to the entity/vehicle on which an AEP trailer bases its movements once paired to that entity/vehicle. For instance, in some embodiments, the candidate lead vehicle may correspond to a tow vehicle (e.g., the vehicle that a driver may be operating) and/or may correspond to another AEP trailer that may be directly (or indirectly) virtually coupled to the tow vehicle. Stated differently, a tow vehicle or a towing entity, as generally used herein, may relate to any suitable vehicle with which the AEP trailer is able to maintain a persistent virtual or digital connection for towing the AEP trailer from a starting location to an ending location.

It shall be noted that, in some embodiments, an AEP trailer may be considered as being indirectly virtually coupled (or indirectly digitally coupled) to a towing entity if that AEP trailer is virtually coupled to the towing entity via one or more other AEP trailers. Conversely, in some embodiments, an AEP trailer may be considered as being directly virtually coupled (or directly digitally coupled) to a towing entity if that AEP trailer is directly (digitally) paired with or tethered to the towing entity and/or if that AEP trailer directly monitors driving maneuvers performed by the towing entity.

In one implementation, a candidate lead vehicle may be identified based on the AEP trailer detecting that the candidate lead vehicle is oriented in a predetermined manner relative to the AEP trailer and/or based on the AEP trailer detecting that the candidate lead vehicle is within a threshold distance of the AEP trailer (and, optionally, not exceeding a maximum towing distance value away from the candidate lead vehicle). In one example of such implementation, upon identifying or detecting a presence of the candidate lead vehicle (towing entity), the AEP trailer may function to capture, via one or more optical sensors (e.g., cameras), one or more images of the candidate lead vehicle and/or may function to detect, via one or more machine learning models, one or more features of the candidate lead vehicle (e.g., license plate number, vehicle manufacturer, vehicle type, vehicle model, Bluetooth address, and/or the like). It shall be noted that, in some embodiments, the one or more images of the candidate lead vehicle may comprise images of the candidate lead vehicle from different viewpoints or angles.

Additionally, or alternatively, in a second implementation, the candidate lead vehicle may be identified based on user input. In one example of such embodiments, a user may select a candidate lead vehicle for pairing via one or more inputs directed to a user interface of a remote device, a user interface of an electronic device in operative communication with the AEP trailer, and/or a remote control.

Generating a Pairing Proposal

Additionally, or alternatively, in some embodiments, S210 may function to generate a pairing proposal based on (e.g., in response to) identifying a candidate lead vehicle. The pairing proposal, sometimes referred to herein as a "movement synchronization pairing proposal," may be transmitted to (e.g., presented at) an electronic device of a target user and/or may enable the target user to accept or reject the pairing of the candidate lead vehicle with the AEP trailer. Furthermore, in some embodiments, generating the pairing proposal may include adding data that may aid the user in their acceptance or rejection decision. For instance, in some embodiments, the pairing proposal may include the one or more images of the candidate lead vehicle captured via the one or more cameras (e.g., sensors) of the AEP trailer and/or may include the one or more features (e.g., license plate number) of the candidate lead vehicle captured via the one or more machine learning models of the AEP trailer.

Virtually Tethering the AEP Trailer to Candidate Lead Vehicle

In some embodiments, S210 may function to virtually pair or tether the AEP trailer to the candidate lead vehicle (also referred to as a "candidate towing entity" or a "towing entity" in some portions of the disclosure). For instance, in one non-limiting example, based on S210 identifying an acceptance (or confirmation) of the pairing proposal, S210 may function to initialize a process for virtually pairing or tethering the AEP trailer to the candidate lead vehicle. It shall be noted that virtually tethering the AEP trailer to the candidate lead vehicle, in some portions of the disclosure, may be referred to as "orchestrating a virtual tow-link between the AEP trailer and a towing entity," and that one or more of the processes (e.g., S210-250), embodiments, examples described herein may be performed during an orchestration of the virtual tow-link.

In some embodiments, once virtually paired or tethered to the candidate lead vehicle, the AEP trailer may enter or transition to an "autonomous follow" state (e.g., a virtual tethering operating mode). For instance, in a non-limiting example, once virtually paired or tethered to the candidate lead vehicle, the AEP trailer may change from operating in a "solo mode" (e.g., "unpaired state," "a physical tethering mode," and/or the like) to operating in an "autonomous follow mode." It shall be noted that, in some portions of the disclosure, "solo mode" may refer to a state of the AEP trailer in which vehicle motions are controlled via an onboard autonomous driving stack (e.g., and not based on a leading vehicle), whereas "autonomous follow mode" may refer to a state of the AEP trailer in which vehicle motions are intended to mimic or emulate a target lead vehicle (as will be described in more detail herein).

In some embodiments, when the AEP trailer is operating in the physical tethering mode, the AEP trailer may be mechanically coupled to the towing entity and/or may dynamically provide torque assistance to the towing entity via one or more motors of the AEP trailer. Conversely, when the AEP trailer is operating in the virtual tethering mode, the AEP trailer is virtually coupled to the towing entity via the virtual tow-link and adaptively maintains a pre-determined trailing distance from the towing entity. It shall be noted that, in some embodiments, the pre-determined trailing distance at which the AEP trailer follows the towing entity during the virtual tethering mode may be statistically similar or equivalent (e.g., substantially similar or equivalent) to a distance between the AEP trailer and the towing entity during the physical tethering mode.

Further to the embodiments described, a virtual tow-link, as generally used herein, may be defined as a non-physical connection between a towing entity and an AEP trailer that enables driving actions or dynamics of the towing entity to inform a driving behavior or (driving policy) of a towed entity that is being towed by the towing entity (e.g., AEP trailer). Additionally, or alternatively, the virtual towing link may be established based on the towed entity entering a predetermined towing distance of the towing entity and not exceeding a maximum towing distance value away from the towing vehicle.

2.20 Sourcing Motion-Informative Sensing Data

S220, which includes sourcing motion-informative sensing data, may function to identify or collect one or more streams of sensing data from one or more sensing sources (e.g., sensors). In some embodiments, the motion-informative sensing data may enable (e.g., support) one or more downstream operations of the method 200 in estimating likely current driving dynamics or characteristics of the AEP trailer and/or the towing entity. For instance, in one non-limiting example, the motion-informative sensing data (also referred to as "real-time sensing data") may be used by the method 200 to estimate (e.g., sense) a likely current speed, position, rate of acceleration, rate of deceleration, heading, directional orientation, lateral position, longitudinal position, etc. of the towing entity and/or the AEP trailer.

It shall be noted that, in some embodiments, S220 may function to continuously (e.g., repeatedly) source or collect new motion-informative sensing data. In some embodiments, this continuous sourcing/collection of motion-informative sensing data may enable the method 200 to continuously estimate, in real time, likely driving dynamics/ characteristics of the AEP trailer and/or the towing entity while such entities are being operated.

In some embodiments, the motion-informative sensing data may be sensed by (e.g., obtained from) one or more sensors implemented at an AEP trailer ("onboard sensors") or a towing entity ("offboard sensors"). For instance, in a non-limiting example, S220 may function to collect sensing data from one or more inertial measurement units (IMUs) implemented at the AEP trailer or the towing entity, one or more global positioning systems (GPSs) implemented at the AEP trailer or the towing entity, one or more wheel encoder sensors implemented at the AEP trailer or the towing entity (e.g., anti-lock braking systems (ABSs)), one or more optical sensors (e.g., image capturing devices, cameras, etc.) implemented at the AEP trailer or the towing entity, one or more radars implemented at the AEP trailer or the towing entity, one or more lidars implemented at the AEP trailer or the towing entity, one or more ultrasonic sensors implemented at the AEP trailer or the towing entity, and/or the like.

Additionally, or alternatively, in some embodiments, S220 may function to collect or source sensing data from a differential GPS system that may be configured to compute a relative distance between an AEP trailer and a towing entity. It shall be noted that the above-described example sensors are not intended to be limiting and that S220 may function to source sensing data from additional, different or fewer sensors without departing from the scope of the disclosure contemplated herein. For instance, in one example, S220 may function to source sensing-related data from one or more modules that may be configured to compute a relative state between a towing entity and an AEP trailer (e.g., relative distance, relative position, relative speed, and/or the like).

In some embodiments, as generally referred to herein, an IMU sensor, a GPS sensor, a wheel encoder sensor, and a camera/radar/lidar/ultrasonic sensor implemented at a target vehicle may function to sense or measure a current orientation and/or motion of the target vehicle; a current position, heading, or speed of the target vehicle; a current rotational speed of a respective wheel associated with the target vehicle; a position, distance, speed, orientation, and/or the like of a target leading vehicle or of one or more vehicles ahead of the target leading vehicle, respectively.

It shall be noted that, in some embodiments, the AEP trailer may function to receive (e.g., obtain) sensing data sensed at a target lead vehicle via any suitable technique/ manner including, but not limited to, a vehicle-to-vehicle (V2V) communication channel, a bi-directional wireless communication channel, a physical signal link coupled to the target lead vehicle and an AEP trailer, and/or the like.

Sensor Fusion Algorithm

Additionally, or alternatively, in some embodiments, S220 may function to implement a sensor fusion algorithm. The sensor fusion algorithm, in some embodiments, may function to receive a corpus of sensor data as input and produce, as output, one or more likely driving dynamics/ characteristics of the towing entity and/or the AEP trailer. For instance, in a non-limiting example, S220 may function to provide the collected motion-informative sensing data as input to the sensor fusion algorithm and, in turn, the sensor fusion algorithm may function to estimate/determine, among others driving dynamics/characteristics, a likely current speed, position, acceleration, heading, and/or orientation of the AEP trailer and/or the towing entity.

In some embodiments, S220 may function to provide direct telemetry data and/or indirect telemetry as input to the sensor fusion algorithm. Direct telemetry data, in some embodiments, as generally referred to herein, may relate to sensing data directly sourced from sensors of the AEP trailer and/or the towing entity. Conversely, indirect telemetry data, in some embodiments, as generally referred to herein, may relate to sensing data derived based on direct telemetry data (but, optionally, not measured directly from sensors). For instance, in some embodiments, the indirect telemetry data provided to the sensor fusion algorithm may include, but should not be limited to, data relating to a relative state between a lead vehicle (e.g., towing entity) and an AEP trailer, such as a relative distance, position, speed, and/or orientation between a lead vehicle and an AEP trailer.

Furthermore, in some embodiments, based on receiving sensing data as input, the sensor fusion algorithm may function to synthesize one or more new sensing artifacts by, optionally, combining, weighting, correlating, aggregating, and/or applying mathematical operations to the inputted sensing data. In some embodiments, these one or more new sensing artifacts and, optionally, the sensing data provided as input may be referenced/accessed, by one or more voting algorithms of the sensor fusion algorithm, to estimate one or more likely driving dynamics/characteristics of the AEP trailer and/or the lead vehicle (e.g., likely speed, acceleration, heading, and/or orientation).

2.30 Implementing Autonomous Follow Predictive Algorithms

S230, which includes implementing autonomous follow predictive algorithms, may function to implement (and execute) one or more autonomous follow predictive algorithms based on the sensor data sourced in S220. In some embodiments, the one or more autonomous follow predictive algorithms may be part of a Close Distance Autonomous Follow (CDAF) system implemented at a target AEP trailer and/or may be specifically trained to predict/estimate one or more autonomous follow parameters that support the AEP trailer in autonomously following a target lead vehicle (e.g., the vehicle paired with/tethered to the AEP trailer).

Estimating a Current Trajectory of the Towing Entity

In some embodiments, the one or more autonomous follow predictive algorithms (implemented by S230) may comprise a predictive algorithm/machine learning model that may be specifically trained to predict/estimate a current trajectory of the towing entity (e.g., a lead vehicle). In one example of such embodiments, the predictive algorithm may be trained using a corpus of (labeled) training samples, such that once trained, the AEP trailer can use the predictive algorithm to estimate a current trajectory of a towing entity. In some embodiments, the corpus of training samples used to train the above-described predictive algorithm may include one or more training samples that relate sample direct telemetry data associated with the towing entity, sample indirect telemetry data associated with the towing entity, and/or sample current driving characteristics of the towing entity (e.g., machine-learnable features) to a current trajectory (path) of the towing entity.

Accordingly, in some embodiments, to estimate a current trajectory of a towing entity, S230 may function to provide, as input to the predictive algorithm, at least a subset of the sensor data sourced in S220 and/or the estimated current driving characteristics of the towing entity (also computed in S220). In turn, based on the data provided as input, the predictive algorithm may function to compute a current trajectory/path of the towing entity. For instance, in a non-limiting example, the predictive algorithm may function to compute an output/inference that indicates a likely current steering angle value of the towing entity, a likely current steering torque value of the towing entity, a likely current yaw rate of the towing entity, a likely current lateral acceleration value of the towing entity, and/or the like.

Estimating a Future Trajectory of the Towing Entity

In some embodiments, the one or more autonomous follow predictive algorithms (implemented by S230) may comprise a predictive algorithm that may be specifically trained to predict/estimate a future trajectory of the towing entity (e.g., a lead vehicle). In one example of such embodiments, the predictive algorithm may be trained using a corpus of (labeled) training samples, such that once trained, the AEP trailer can use the predictive algorithm to estimate a future trajectory of a towing entity. In some embodiments, the corpus of training samples used to train the above-described predictive algorithm may include one or more training samples that relate sample direct telemetry data associated with the towing entity, sample indirect telemetry data associated with the towing entity, and/or sample current driving characteristics of the towing entity (e.g., machine-learnable features) to a future trajectory (path) of the towing entity.

Accordingly, in some embodiments, to estimate a future trajectory of a towing entity, S230 may function to provide, as input to the predictive algorithm, at least a subset of the sensor data sourced in S220 and/or the estimated current driving characteristics of the towing entity (also computed in S220). In turn, based on the data provided as input, the predictive algorithm may function to compute a future trajectory/path of the towing entity. For instance, in a non-limiting example, the predictive algorithm may function to compute an output/inference that indicates a likely future steering angle value of the towing entity during a period of time (e.g., 1-2 seconds), a likely current steering torque value of the towing entity during a period of time (e.g., 1-2 seconds), a likely current yaw rate of the towing entity during a period of time (e.g., 1-2 seconds), a likely current lateral acceleration value of the towing entity during a period of time (e.g., 1-2 seconds), and/or the like.

Estimating a Current and/or Future Motion of the Towing Entity

In some embodiments, the one or more autonomous follow predictive algorithms (implemented by S230) may comprise a predictive algorithm that may be specifically trained to estimate a current and/or future motion (e.g., a trajectory) of the towing entity (e.g., a lead vehicle). In one example of such embodiments, the predictive algorithm may be trained using a corpus of (labeled) training samples, such that once trained, the AEP trailer can use the predictive algorithm to estimate a current and/or future motion of a towing entity. In some embodiments, the corpus of training samples used to train the above-described predictive algorithm may include one or more training samples that relate sample direct telemetry data associated with the towing entity, sample indirect telemetry data associated with the towing entity, and/or sample current driving characteristics of the towing entity (e.g., machine-learnable features) to a current or future motion of the towing entity.

Accordingly, in some embodiments, to estimate a current and/or future motion of the towing entity, S230 may function to provide, as input to the predictive algorithm, at least a subset of the sensor data sourced in S220 and/or the estimated current driving characteristics of the towing entity (also computed in S220). In turn, based on the data provided as input, the predictive algorithm may function to compute a current estimated motion and/or an estimated future motion of the towing entity. For instance, in a non-limiting example, the predictive algorithm may function to compute an output that indicates the towing entity may be currently, or may in the future (e.g., 1-2 seconds), be performing a right turn driving maneuver, a left turn driving maneuver, a forward driving maneuver, a reverse driving maneuver, a long turn driving maneuver (e.g., at a roundabout), a lane change driving maneuver, a U-turn driving maneuver, other types of turning maneuvers, an acceleration or deceleration driving maneuver, a speed change driving maneuver, and/or the like.

Stated differently, in some embodiments, the real-time sensing data sourced in S220 may be provided to a predictive model as input. This real-time sensing data, in some embodiments, may be indicative of a current trajectory or path of the towing entity. Based on obtaining the input, the predictive model may then be configured to produce an output that predicts future trajectory changes of the towing entity based at least on the current trajectory of the towing entity.

Trajectory Estimation Examples

For instance, in a first non-limiting example, sourcing the real-time sensing data in S220 may at least include sensing a current directional orientation of the towing entity. In response to (or based on the sourcing), S230 may provide an input, to the above-described model(s), that at least includes the current directional orientation of the towing entity. The above-described model(s) may then estimate that the towing entity is performing a turning maneuver (e.g., directional change maneuver) when the current directional orientation of the towing entity changes by more than a threshold amount during a specified time interval.

Additionally, in a second non-limiting example, sourcing the real-time sensing data in S220 may at least include sensing a lateral position of the towing entity. In response to (or based on the sourcing), S230 may provide an input, to the above-described model(s), that at least includes the lateral position of the towing entity. The above-described model(s) may then estimate that the towing is performing a lane change maneuver (e.g., a lateral movement maneuver) when the lateral position of the towing entity changes by more than a threshold amount during a specified time interval.

Furthermore, in a third non-limiting example, sourcing the real-time sensing data in S220 may at least include sensing a current speed of the towing entity. In response to (or based on the sourcing), S230 may provide an input, to the above-described model(s), that at least includes the current speed of the towing entity. The above-described model(s) may then estimate that a speed of the towing entity changed when the current speed of the towing entity deviates from a previously observed speed.

2.40 Planning an Autonomous Follow Path for the AEP Trailer

S240, which includes planning an autonomous follow path, may function to plan or compute a (desired) follow path for the AEP trailer based on outputs of S220 and/or S230. In some embodiments, an autonomous follow path, as generally referred to herein, may relate to the path that the AEP trailer may need to obey/follow during a period of time (e.g., 1-2 seconds) in order for the AEP trailer to faithfully, safely, robustly, and/or accurately follow a target towing entity.

Autonomous Follow Path Planning Algorithm

In some embodiments, the autonomous follow path may be computed via an autonomous follow path planning algorithm. The autonomous follow path planning algorithm, in some embodiments, may function to propose/output an (optimal) autonomous follow path for the AEP trailer based on model inputs comprising the motion-informative sensing data (sensed in S220), the likely current driving characteristics of the towing entity (computed in S220), the estimated current path/trajectory of the towing entity (computed in S230), the estimated current motion of the towing entity (computed in S230), the estimated future path/trajectory of the towing entity (computed in S230), and/or the estimated future motion of the towing entity (computed in S230).

Figure 3:
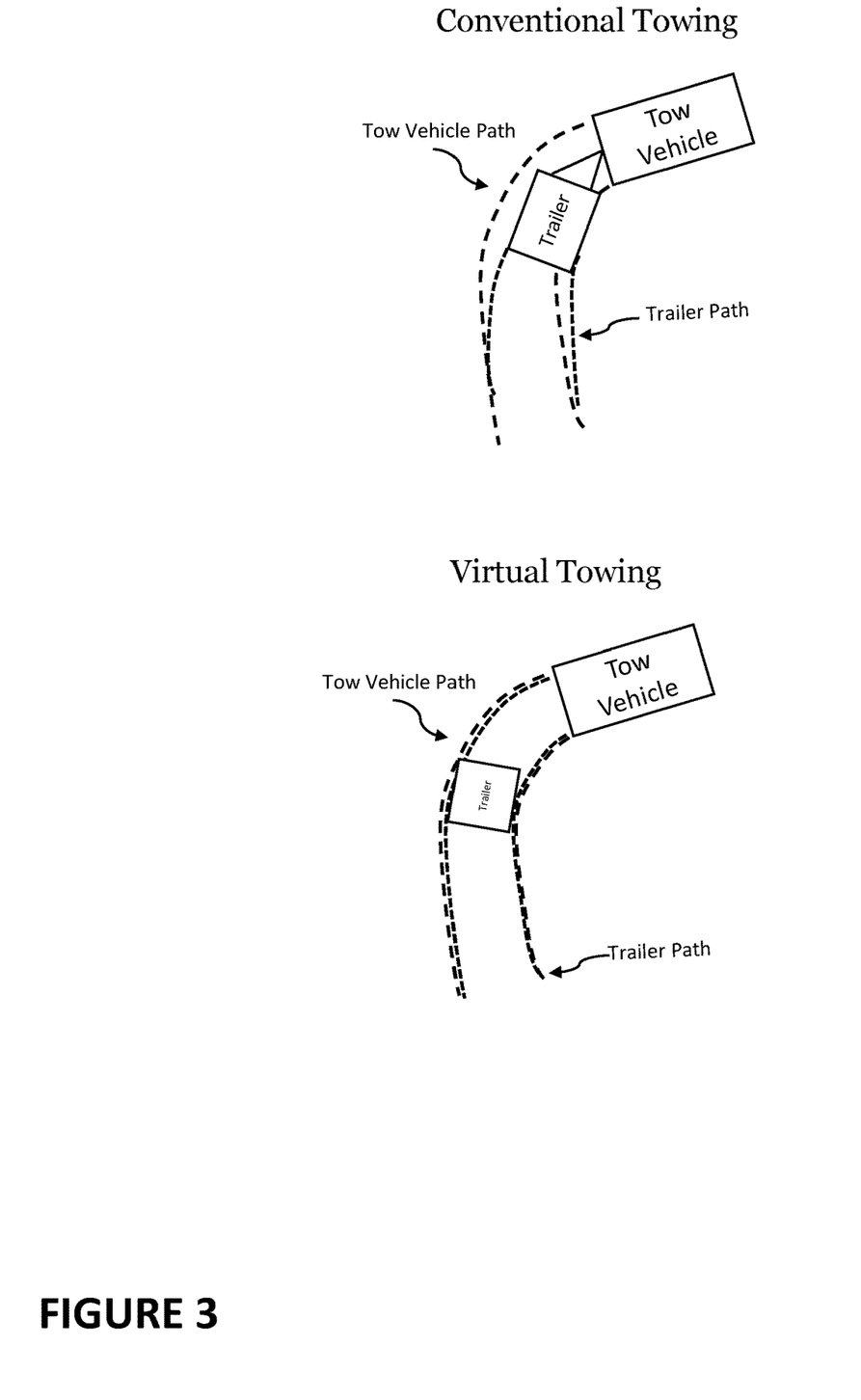
FIG. 3 illustrates an example of virtual towing during a turning maneuver in accordance with one or more embodiments of the present application.

In some embodiments, once computed and as generally illustrated in FIG. 3, the autonomous follow path may include a left movement boundary and/or a right movement boundary for the AEP trailer to stay within during a period of time (e.g., 1-2 seconds). In some embodiments, as will be described in more detail herein, the left movement boundary and the right movement boundary may be computed based on a current driving maneuver associated with the tow vehicle and/or based on current driving characteristics of the tow vehicle.

Computing an Optimal Follow Distance

Additionally, or alternatively, in some embodiments, planning an autonomous follow path may include computing an (optimal) following distance for the AEP trailer. In some embodiments, the (optimal) following distance may relate to the distance that the AEP trailer may need to follow the towing entity to reduce (or minimize) air drag on the AEP trailer. Furthermore, in some embodiments, the computation of the (optimal) following distance may be constrained between a minimum separation distance and a maximum separation distance. It shall be noted that, in some embodiments, constraining the computation space between a minimum and a maximum separation distance may enable S240 to compute an (optimal) following distance while still preventing an ability of a third-party vehicle to occupy space directly ahead of the AEP trailer. It shall also be noted that, in some portions of the disclosure, the term (optimal) following distance may be referred to as a "target following distance," "maximum aerodynamic drag-reducing trailing distance," and/or the like.

In some embodiments, to compute the (optimal) following distance for the AEP trailer, S240 may function to implement a predictive following distance algorithm. The predictive following distance algorithm, in some embodiments, may function to compute, as output, an (optimal) following distance for the AEP trailer based on inputs of one or more tethering parameters associated with the AEP trailer and/or the towing entity (e.g., vehicle size, vehicle geometry, vehicle shape, and/or the like); the estimated current (or future) motion of the towing entity; the estimated current (or future) trajectory of the towing entity; direct telemetry data associated with the towing entity or the AEP trailer; indirect telemetry data associated with the towing entity or the AEP trailer; and/or the like. Additionally, or alternatively, in some embodiments, the (optimal) following for an AEP trailer may be computed based on prior learnings from following a target AEP trailer.

In a varying example, in some embodiments, the aforementioned virtual tow-link may cause the AEP trailer to follow the towing entity at a pre-determined trailing distance. Thus, in such an example, computing a maximum aerodynamic drag-reducing trailing distance for the AEP trailer based at least on a shape of the AEP trailer and a shape of the towing entity. The maximum aerodynamic drag-reducing trailing distance, in some embodiments, may be used as the pre-determined trailing distance if the optimal aerodynamic drag-reducing trailing distance satisfies a minimum separation distance and a maximum separation distance.

Autonomous Follow Path Planning for Steady Steering State

In some embodiments, based on the method 200 detecting/determining that the tow vehicle is currently in a steady state (e.g., driving straight), the autonomous follow path planning algorithm may compute an autonomous follow path that, when followed, causes the AEP trailer to spatially align with the towing entity (e.g., be located directly behind the towing entity, match a steering angle of the towing entity, etc.) and/or causes the AEP trailer to (continuously) follow the tow entity at a target following distance (as computed by the predictive following distance algorithm).

In some embodiments, to enable the AEP trailer to (continuously) follow the tow entity at the (optimal) following distance, the method 200 may function to continuously detect driving characteristics of the towing entity (e.g., lead vehicle) and/or may function to correspondingly (e.g., proportionally) adjust the driving characteristics of the AEP trailer based on any detected changes. For instance, in a non-limiting example, based on the method 200 detecting a change in a speed or acceleration of the towing entity, the method 200 may function to correspondingly modify driving characteristics (e.g., a speed or acceleration) of the AEP trailer in a manner that allows the AEP trailer to follow the towing entity at the computed (optimal) following distance regardless of changes in driving characteristics at the towing entity.

Stated another way, in virtual tethering mode, the AEP trailer may follow the towing entity at a distance similar to when the AEP trailer is being physically towed by the towing entity (e.g., during physical tethering mode). As the towing entity moves from an initial location (e.g., starting location) to an ending location (e.g., destination), the AEP trailer may detect changes in driving dynamics at the AEP trailer adjust driving dynamics at the AEP trailer, via one or more ways described herein, to adaptively maintain the pre-determined trailing distance from the towing entity.

Autonomous Follow Path Planning for Turning Maneuvers

In some embodiments, based on the method 200 detecting/determining that the towing vehicle has moved from a steady driving state to performing a turning maneuver (e.g., a directional change maneuver), the autonomous follow path planning algorithm may compute an autonomous follow path that, when followed, causes the AEP trailer to (continuously) spatially mirror match, or emulate the turning motion/steering angle of the towing entity throughout the tuning maneuver (as generally illustrated in FIG. 3). In one example of such embodiments, to enable the AEP trailer to mirror or match the turning motion/steering angle of the towing entity, S240 may function to compute a set of executable instructions (commonly referred to herein as "movement synchronization actuator commands") that, when executed, cause the AEP trailer to follow the towing entity at an increased trailing distance related to the towing entity (as also generally illustrated in FIG. 3) and/or that cause a path of the AEP trailer to move into alignment with the trajectory of the towing entity.

It shall be noted that above-described behavior, as compared to traditional towing methods (as also generally illustrated in FIG. 3), may reduce burden on the driver during towing because the driver may no longer need to consider the turning radius of a trailer when performing a turning maneuver (e.g., whether the trailer can safely make a desired turn). Furthermore, in some embodiments, such behavior may additionally, or alternatively, provide the driver an ability to maneuver (e.g., turn) the towing entity based on its minimum turning radius without fear of the AEP trailer colliding or deviating from the undertaken driving path.

Autonomous Follow Path Planning for Lateral Movement (e.g., Lane Changes)

In some embodiments, based on the method 200 detecting/determining that the towing vehicle has moved from a steady driving state to performing a lateral movement maneuver (e.g., lane change driving maneuver or a parallel parking driving maneuver, etc.), the autonomous follow path planning algorithm may compute an autonomous follow path that, when followed, causes the AEP trailer to emulate the movements of the towing entity throughout the lateral movement maneuver. In some embodiments, as generally illustrated in FIG. 4, when the AEP trailer emulates the lateral movement of the towing entity, the AEP trailer may proceed into a target lane contemporaneously with the tow vehicle.

Figure 4:
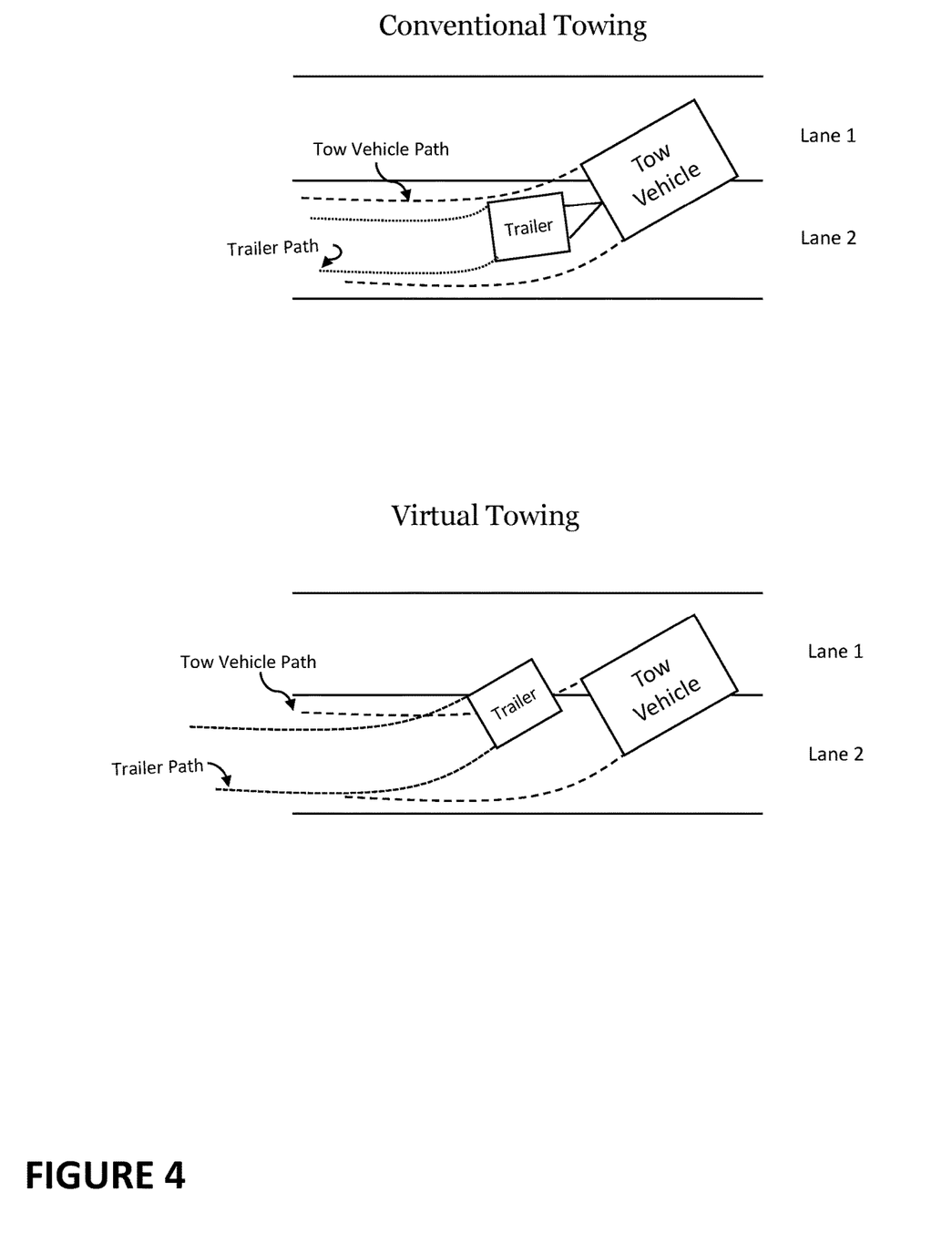
FIG. 4 illustrates an example of virtual towing during a lane change maneuver in accordance with one or more embodiments of the present application.

In one example of such embodiments, to enable the AEP trailer to mirror or match (e.g., emulate) the lateral movement maneuver of the towing entity, S240 may function to compute a set of one or more executable instructions (commonly referred to herein as "movement synchronization actuator commands") that, when executed, cause a lateral displacement of the AEP trailer to increase relative to a center of the towing entity and/or that cause the lateral movement of the towing entity to match a lateral movement of the towing entity within a specified time interval (as also generally illustrated in FIG. 4). It shall be noted that above-described behavior, as compared to traditional towing methods (as also generally illustrated in FIG. 4), may reduce the total time required for completing a lane change because the AEP trailer is emulating/mimicking the movement (e.g., steering angle) of the towing entity as opposed to directly following the towing entity.

2.50 Autonomously Following the Towing Entity

S250, which includes autonomously following the towing entity, may function to generate and/or execute one or more autonomous trailer driving instructions (e.g., movement synchronization actuator commands) that, when executed, cause the AEP trailer to automatically follow the towing entity (e.g., without user input). It shall be recognized that, in some embodiments, autonomously following the towing entity may be an iterative process that may include one or more feedback loops or systems for assisting the autonomous driving and/or autonomous follow computations of the AEP trailer. Accordingly, in some embodiments, one or more steps of the method 200 may be performed one or more times in a continuous or in a repeating sequential (or non-sequential) manner to facilitate/support the AEP trailer in autonomously following a towing entity (e.g., lead vehicle).

Generating the Autonomous Trailer Driving Instructions

In some embodiments, to generate the autonomous trailer driving instructions, S250 may function to route the (optimal) autonomous follow path and/or the (optimal) following distance computed in S240 as input into a motion control algorithm of the AEP trailer. In one example of such embodiments, based on receiving the input, the motion control algorithm may function to generate/compute one or more autonomous trailer driving instructions that, when executed, cause the AEP trailer to proceed/progress in a manner consistent with the computed (optimal) autonomous follow path and/or cause the AEP trailer to follow the towing entity in a manner consistent with the computed (optimal) following distance.

In some embodiments, the one or more autonomous trailer driving instructions generated/computed by the motion control algorithm may comprise computer-executable instructions that, when executed, control one or more battery-related components of the AEP trailer, one or more (e.g., propulsion) motors of the AEP trailer, one or more steering components of the AEP trailer, one or more brakes of the AEP trailer, and/or the like. For instance, in a non-limiting example, the motion control algorithm may function to generate one or more motor control instructions (e.g., movement synchronization actuator commands) that comprise a distinct target motor voltage for one or more motors of the AEP trailer and/or generate one or more braking control instructions that comprise a distinct braking voltage signal for one or more brakes of the AEP trailer.

Executing the Autonomous Trailer Driving Instructions

In some embodiments, the motion control algorithm may be operatively connected or coupled to one or more (electric) motors of the AEP trailer, one or more braking components of the AEP trailer, one or more steering components of the AEP trailer, and/or the like. Accordingly, in some embodiments, executing the one or more autonomous trailer driving instructions may include driving the one or more (electric) motors and/or modulating one or more braking components of the AEP trailer in accordance with the one or more autonomous trailer driving instructions.

It shall be noted that, as described in the system 100, the one or more electric motors of the AEP trailer may operate (e.g., turn) one or more wheels of the AEP trailer, and thus, driving the electric motors of the AEP trailer may adjust operating characteristics of the wheels of the AEP trailer (e.g., wheel rotation speed). It shall also be noted that, as also described in system 100, the one or more braking components of the AEP trailer may function to decelerate one or more wheels of the AEP trailer, and thus, modulating the braking components of the AEP trailer may adjust operating characteristics of the wheels of the AEP trailer (e.g., decrease rotational speed of the wheels).

Continuous Safety/Fault Detection|Fail-Safe Link

Additionally, or alternatively, in some embodiments, S250 may function to implement a continuous safety and/or fault detection system (e.g., a physical or electronic fail-safe). The continuous safety and/or fault detection system, in some embodiments, may function to detect towing safety faults that may occur at the AEP trailer or the associated towing entity.

In one implementation, the continuous safety and/or fault detection system may comprise a high integrity ranging sensor system or an electronic (or physical) fail-safe link. Accordingly, in some embodiments, when the continuous safety/fault detection system detects a break (e.g., disruption) in the digital or physical fail-safe link, S250 may cause the AEP trailer to enter a "safe state mode" that causes the AEP trailer to override the current operations of the AEP trailer and move to a location where the AEP trailer can safety stop and remained stopped until the digital or physical-safe link can be re-established. Stated differently, in some embodiments, the electronic fail-safe, when disrupted, may cause the AEP trailer to initiate a pre-defined safety protocol. The pre-defined safety protocol may execute autonomous driving operations that cause the AEP trailer to move to a stopping location. The AEP trailer, in some embodiments, may remain parked at the stopping location until the electronic fail-safe is re-established.

Additionally, or alternatively, the continuous safety and/or fault detection system may detect that a current trajectory of the AEP trailer is likely to collide with an object. In response, the AEP trailer may forgo executing a set of movement synchronization actuator commands that cause the AEP trailer to emulate the trajectory of the towing entity and, instead, execute collision-avoidance maneuvers that deviate from the trajectory of the towing entity to prevent the collision with the object.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

Although omitted for conciseness, the preferred embodiments may include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A method for orchestrating movement between an autonomous electric-powered (AEP) trailer and a towing entity, the method comprising:
  detecting a presence of a towing entity;
  while the autonomous electric-powered (AEP) trailer is in an unpaired state with the towing entity:
    capturing, via one or more sensors of the autonomous electric-powered (AEP) trailer, a plurality of images of the towing entity from different angles;
    detecting, via one or more machine learning models of the autonomous electric-powered (AEP) trailer, one or more features of the towing entity, including a license plate number of the towing entity;
    generating, by the autonomous electric-powered (AEP) trailer, a movement synchronization pairing proposal between the autonomous electric-powered (AEP) trailer and the towing entity based on detecting the presence of the towing entity, wherein the movement synchronization pairing proposal includes the one or more features of the towing entity and the plurality of images of the towing entity from different angles;
    transmitting, by the autonomous electric-powered (AEP) trailer, the movement synchronization pairing proposal to a mobile phone of a target user for accepting or rejecting the movement synchronization pairing proposal between the autonomous electric-powered (AEP) trailer and the towing entity; and
    obtaining, from the mobile phone, user input accepting the movement synchronization pairing proposal; and
  orchestrating a virtual tow-link between the AEP trailer and the towing entity based on obtaining the user input accepting the movement synchronization pairing proposal, wherein orchestrating the virtual tow-link includes:
    (1) sourcing, via the one or more sensors of the AEP trailer, real-time sensing data indicative of current driving dynamics of the towing entity, including a lateral position of the towing entity,
    (2) estimating a trajectory of the towing entity based on the real-time sensing data, wherein:
      the trajectory indicates a current driving maneuver associated with the towing entity, and
      estimating the trajectory of the towing entity includes estimating that the towing entity is performing a lane change driving maneuver when the lateral position of the towing entity changes by more than a threshold amount during a specified time interval,
    (3) computing a following distance for the AEP trailer based on the trajectory of the towing entity, wherein the following distance for the AEP trailer is different when the current driving maneuver is a steady state driving maneuver compared to when the current driving maneuver corresponds to a turning driving maneuver,
    (4) generating a set of movement synchronization actuator commands based on the trajectory of the towing entity and the following distance computed for the AEP trailer, wherein when the trajectory of the towing entity relates to the lane change driving maneuver, generating the set of movement synchronization actuator commands at least includes generating one or more actuator commands that cause a lateral movement of the AEP trailer to match a lateral movement of the towing entity within the specified time interval,
    (5) executing, at the AEP trailer, the set of movement synchronization actuator commands to emulate the trajectory of the towing entity at the following distance, wherein when the trajectory of the towing entity relates to the lane change driving maneuver, executing the set of movement synchronization actuator commands causes the AEP trailer to proceed into a target lane contemporaneously with the towing entity instead of directly following a rear of the towing entity, and (6) repeating (1)-(5) until the virtual tow-link is deactivated.

2. The method according to claim 1, wherein:

a steerable axle of the autonomous electric-powered (AEP) trailer includes an electric-powered jacking mechanism that lifts and lowers the steerable axle, and during a physical tethering mode of the AEP trailer, the autonomous electric-powered (AEP) trailer executes an automated hitching operation that uses the electric-powered jacking mechanism to automatically lift and lower a coupler of the autonomous electric-powered (AEP) trailer over a tow hitch of the towing entity.

3. The method according to claim 1, wherein:

the autonomous electric-powered (AEP) trailer comprises a caster wheel that steers the autonomous electric-powered (AEP) trailer, the caster wheel is powered by a respective electric motor of the AEP trailer and is a foremost wheel of the AEP trailer, the respective electric motor executes at least a subset of the set of movement synchronization actuator commands to emulate the trajectory of the towing entity, the set of movement synchronization actuator commands includes one or more actuator commands that cause the AEP trailer to follow the towing entity at the following distance, and executing the set of movement synchronization actuator commands causes the AEP trailer to maintain the following distance while emulating the trajectory of the towing entity by at least adjusting a wheel rotation speed of the caster wheel.

4. The method according to claim 1, wherein:

the one or more features of the towing entity further include a vehicle manufacturer associated with the towing entity and a vehicle type associated with the towing entity, the movement synchronization pairing proposal further includes the vehicle manufacturer, the vehicle type, and a Bluetooth address of the towing entity, the AEP trailer is configured to operate in a plurality of modes, including (i) a physical tethering mode and (ii) a virtual tethering mode that orchestrates the virtual tow-link, the physical tethering mode refers to a physical connection between the AEP trailer and the towing entity via a coupler of the AEP trailer and a tongue of the AEP trailer, the virtual tow-link of the virtual tethering mode causes the AEP trailer to follow the towing entity at the following distance, and the following distance at which the AEP trailer follows the towing entity during the virtual tethering mode is substantially similar to a distance between the AEP trailer and the towing entity during the physical tethering mode.

5. The method according to claim 1, wherein:

the AEP trailer is configured to operate in a plurality of modes, including (i) a physical tethering mode and (ii) a virtual tethering mode, when the AEP trailer is operating in the physical tethering mode, the AEP trailer is mechanically coupled to the towing entity and dynamically provides torque assistance to the towing entity via one or more motors of the AEP trailer, wherein:

the AEP trailer became mechanically coupled to the towing entity by at least autonomously navigating to a tow hitch of the towing entity, and autonomously navigating to the tow hitch of the towing entity includes:

determining a path for the AEP trailer to travel to the tow hitch of the towing entity, and autonomously moving the AEP trailer according to the path by at least electronically steering a caster wheel of the AEP trailer, and when the AEP trailer is operating in the virtual tethering mode, the AEP trailer is virtually coupled to the towing entity via the virtual tow-link and adaptively maintains the following distance from the towing entity.

6. The method according to claim 1, wherein:

the real-time sensing data is sourced via the one or more sensors of the AEP trailer and a physical signal link coupled to the towing entity and the autonomous electric-powered (AEP) trailer, the method further comprising:

computing a maximum aerodynamic drag-reducing trailing distance for the AEP trailer based on a shape of the AEP trailer and a shape of the towing entity, and using the maximum aerodynamic drag-reducing trailing distance as the following distance if the maximum aerodynamic drag-reducing trailing distance satisfies a minimum separation distance and a maximum separation distance, wherein constraining the maximum aerodynamic drag-reducing trailing distance between the minimum separation distance and the maximum separation distance prevents a third-party vehicle from occupying space ahead of the AEP trailer.

7. The method according to claim 1, wherein:

the trajectory indicates the current driving maneuver and a future driving maneuver associated with the towing entity, and the trajectory is computed by a predictive algorithm trained on a corpus of labeled training samples that relates sample indirect telemetry data associated with the towing entity to the current driving maneuver and the future driving maneuver.

8. The method according to claim 1, wherein:

a tongue of the AEP trailer extends from a chassis of the AEP trailer and includes a coupler arranged at a distal end of the tongue of the AEP trailer, sourcing the real-time sensing data at least includes sensing, via the one or more sensors of the AEP trailer, a current directional orientation of the towing entity, estimating the trajectory of the towing entity further includes estimating that the trajectory of the towing entity includes a turning driving maneuver when the current directional orientation of the towing entity changes by more than a threshold amount during a specified time interval, and when the trajectory of the towing entity includes the turning driving maneuver:

generating the set of movement synchronization actuator commands at least includes generating one or more actuator commands that cause the AEP trailer to match a turning radius of the towing entity by increasing the following distance of the AEP trailer, and executing the set of movement synchronization actuator commands causes the AEP trailer to emulate the turning driving maneuver being performed by the towing entity.

9. The method according to claim 1, wherein:
sourcing the real-time sensing data at least includes sensing, via the one or more sensors of the AEP trailer, a current speed of the towing entity,
estimating the trajectory of the towing entity further includes estimating that a speed of the towing entity changed when the current speed of the towing entity deviates from a previously observed speed, and
when the trajectory of the towing entity indicates that the speed of the towing entity has changed:
generating the set of movement synchronization actuator commands at least includes generating one or more actuator commands that change a speed of the AEP trailer for maintaining the following distance between the towing entity and the AEP trailer, and
executing the set of movement synchronization actuator commands causes the AEP trailer to emulate changes to the speed of the towing entity.

10. The method according to claim 1, further comprising:
implementing a physical fail-safe for the virtual tow-link that, when disrupted, causes the AEP trailer to initiate a pre-defined safety protocol, wherein:
the pre-defined safety protocol executes autonomous driving operations that cause the AEP trailer to move to a stopping location, and
the AEP trailer remains parked at the stopping location until the physical fail-safe is re-established.

11. The method according to claim 1, wherein:
the trajectory of the towing entity corresponds to a current trajectory of the towing entity, wherein the current trajectory indicates the current driving maneuver, and
computing the following distance for the AEP trailer is based on the current trajectory of the towing entity and further based on a future trajectory of the towing entity, wherein the future trajectory indicates a future driving maneuver,
the method further comprising:
estimating the future trajectory of the towing entity, wherein estimating the future trajectory of the towing entity includes using a predictive model that is configured to predict the future trajectory of the towing entity based at least on the current trajectory of the towing entity, wherein the future trajectory predicts at least one second ahead of the current trajectory of the towing entity.

12. The method according to claim 1, further comprising:
detecting, by the AEP trailer, that the trajectory of the AEP trailer is likely to result in a collision with an object, and
based on detecting that the trajectory of the AEP trailer is likely to result in the collision with the object:
forgoing executing the set of movement synchronization actuator commands, and
executing, by the AEP trailer, collision-avoidance maneuvers that deviate from the trajectory of the towing entity to prevent the collision with the object.

13. The method according to claim 1, wherein:
the method comprises:
estimating the trajectory of the towing entity and a future trajectory of the towing entity,
the trajectory of the towing entity includes the lane change driving maneuver and further indicates a current path of the towing entity,
the future trajectory of the towing entity indicates a future driving maneuver associated with the towing entity and further indicates a future path of the towing entity, and
the following distance for the AEP trailer is computed based on the trajectory of the towing entity and further based on the future trajectory of the towing entity.

14. The method according to claim 13, wherein:
the trajectory of the towing entity is one of:
the lane change driving maneuver, and
the steady state driving maneuver, wherein the steady state driving maneuver relates to the towing entity driving in a straight direction, and
the future driving maneuver relates to a turning driving maneuver, wherein the turning driving maneuver involves the towing entity changing from the straight direction to an angular direction.

15. The method according to claim 14, wherein:
the towing entity has a minimum turning radius smaller than the AEP trailer,
the virtual tow-link increases the following distance of the AEP trailer when the towing entity starts performing the turning driving maneuver, and
increasing the following distance enables the AEP trailer to turn at the minimum turning radius without the AEP trailer deviating from a driving path of the towing entity.

16. The method according to claim 15, wherein:
the following distance for the AEP trailer is constrained by a minimum separation distance and a maximum separation distance, and
the minimum separation distance and the maximum separation distance is computed by the AEP trailer and prevents a third-party vehicle from occupying space ahead of the AEP trailer during the steady state driving maneuver and the future driving maneuver.

17. The method according to claim 1, wherein the following distance for the AEP trailer is computed based on the trajectory of the towing entity and further based on:
a future trajectory of the towing entity,
a size of the towing entity, and
a geometry of the towing entity.

18. The method according to claim 17, wherein:
the future trajectory of the towing entity is estimated by a machine learning model that is trained to estimate the future trajectory of the towing entity from the real-time sensing data sourced via the one or more sensors of the AEP trailer, wherein the machine learning model is trained on a corpus of labeled training samples that relates indirect telemetry data associated with a current trajectory of the towing entity to the future trajectory of the towing entity, and
the future trajectory indicates a future driving maneuver expected during a period of time after the lane change driving maneuver, wherein the period of time is one second after the lane change driving maneuver.

19. The method according to claim 1, wherein:
the movement synchronization pairing proposal at least includes:
the plurality of images of the towing entity from different angles,
a Bluetooth address of the towing entity,
a vehicle manufacturer of the towing entity,
a vehicle model of the towing entity, and
the license plate number of the towing entity, and a machine learning model extracted the vehicle manufacturer, the vehicle model, and the license plate number of the towing entity from the plurality of images of the towing entity.

\* \* \* \* \*